(12) United States Patent
Sakthivel et al.

(10) Patent No.: US 10,786,109 B2
(45) Date of Patent: Sep. 29, 2020

(54) SINGLE SERVE BEVERAGE DISPENSER FOR AN APPLIANCE

(71) Applicant: Haier US Appliance Solutions, Inc., Wilmington, DE (US)

(72) Inventors: Dhinesh Babu Sakthivel, Hyderabad (IN); Aditya Kampalli, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 857 days.

(21) Appl. No.: 15/278,161

(22) Filed: Sep. 28, 2016

(65) Prior Publication Data

US 2018/0084938 A1 Mar. 29, 2018

(51) Int. Cl.
*A47J 31/40* (2006.01)
*F25D 23/04* (2006.01)
(Continued)

(52) U.S. Cl.
CPC .............. *A47J 31/407* (2013.01); *B67D 1/00* (2013.01); *F25D 23/04* (2013.01); *F25D 23/126* (2013.01)

(58) Field of Classification Search
CPC ...... A47J 31/407; A47J 31/401; A47J 31/402; A47J 31/403; A47J 31/405; A47J 31/44; A47J 31/4403; A47J 31/10; A47J 31/24; A47J 31/30; A47J 31/34; A47J 31/32; A47J 31/40; A47J 31/4482; A47J 31/02; A47J 31/446; A47J 31/0678; A47J 31/0673; A47J 31/0668; A47J 31/3604; A47J 31/3628; A47J 31/3676; A47J 31/3638; B67D 1/00; B67D 1/0001; B67D 1/0005; B67D 1/001; B67D 1/0078; B67D 1/0079; B67D 1/008; B67D 1/04; B67D 2001/0095;
(Continued)

(56) References Cited

U.S. PATENT DOCUMENTS 9,254,058 B2  2/2016  Bird
2002/0148356 A1* 10/2002 Lazaris ............... A47J 31/0668
99/295

(Continued)

FOREIGN PATENT DOCUMENTS

EP    1674007 A1   6/2006
EP    2070452 B1   3/2010

*Primary Examiner* — Tu B Hoang
*Assistant Examiner* — Diallo I Duniver
(74) *Attorney, Agent, or Firm* — Dority & Manning, P.A.

(57) ABSTRACT

An appliance single serve beverage dispenser, beverage dispensing assembly, and method of operation is provided. The beverage dispensing assembly may include a brewing body, a shutter door, a lower needle assembly, and an upper needle assembly. The brewing body may define an access aperture and a brew chamber. The brewing body may include a bottom plate defining an outlet into the brew chamber along a delivery axis. The shutter door may be slidably attached to the brewing body. The lower needle assembly may be operably attached to the shutter door and include a lower needle slidably disposed within the brewing body along the delivery axis to move between a retracted position and an extended position. The upper needle assembly may be operably attached to the shutter door and include an upper needle slidably disposed within the brewing body along the delivery axis to move between a retracted position and an extended position.

20 Claims, 10 Drawing Sheets

(51) Int. Cl.
*F25D 23/12* (2006.01)
*B67D 1/00* (2006.01)

(58) Field of Classification Search
CPC ..... B67D 3/0019; B67D 3/0003; F25D 23/04; F25D 23/126; F25D 23/02; F25D 23/021; F25D 23/12; F25D 23/123; F25D 31/002; F25D 31/003; F25D 31/005; F25D 31/006; F25D 23/00; F25D 23/003; F25D 23/006
USPC .......................... 99/290, 289 R, 295, 302 P
See application file for complete search history.

(56) References Cited

U.S. PATENT DOCUMENTS

| | | | |
|---|---|---|---|
| 2014/0272076 A1 | 9/2014 | Nevin et al. | |
| 2014/0299000 A1* | 10/2014 | Hanneson | A47J 31/46 99/300 |
| 2014/0345470 A1* | 11/2014 | Venturi | A47J 31/3633 99/283 |
| 2015/0265091 A1* | 9/2015 | Flick | A47J 31/3633 426/112 |

\* cited by examiner

SINGLE SERVE BEVERAGE DISPENSER FOR AN APPLIANCE

FIELD OF THE INVENTION

The present subject matter relates generally to single serve beverage dispensers, and more particularly to single serve beverage dispenser for use in refrigerator appliances.

BACKGROUND OF THE INVENTION

Appliances, such as refrigerator appliances, can include a dispensing assembly for directing ice from an ice maker and/or liquid water to the dispensing assembly. A user can activate the dispensing assembly to direct a flow of ice or liquid water into a cup or other container positioned within the dispensing assembly. Liquid water directed to the dispensing assembly is generally chilled or provided at an ambient temperature. However, certain refrigerator appliances also include features for dispensing heated liquid water that can be used to make hot beverages, such as coffee or tea.

Conventional brew modules include a lower needle positioned in the bottom of the brew chamber and a stationary upper needle extending from a lid which is pivotally attached to the brew module. Each needle defines holes through which liquid may flow. Closing the lid causes the upper and lower needles to pierce the top and bottom of the brew pod, respectively, such that water may flow through the brew pod to create the beverage which is dispensed to the user.

However, when the lid is open on a conventional brew model, one or more needles may be exposed. It is possible that damage may occur, e.g., to the needle(s), when the lid is open or as the lid is being closed. If a foreign object is inadvertently placed beneath the lid, that risk may increase. Furthermore, as the lid closes, the stationary upper needle moves on a circular path with a relatively small radius. The motion of the upper needle tears an oval hole in the top cover of the brew pod, which requires a larger sealing surface. Due, in part, to the orientation of the upper needle and the location of the water supply holes in the upper needle, contents of the brew pod may be forced into water supply holes as the needle is inserted into the brew pod.

In addition, the brew pod initially sits on top of the lower needle and is forced down onto the lower needle as the lid is pivoted to the closed position. Therefore, as the lid pivots toward the closed position, the upper needle often pierces the brew pod before the lower needle pierces the brew pod. Notably, brew pods are commonly pressurized. Therefore, when the upper needle pierces the brew pod first, contents of the brew pod may be ejected into the upper needle. Moreover, due to the larger oval hole in the top of the brew pod, brew pod contents can also be ejected from the brew module.

Accordingly, a refrigerator appliance that includes improved features for dispensing single serve beverages would be useful. More specifically, single serve beverage dispensing assemblies for refrigerator appliances that reduce the exposure of the needles, improve the seal with the brew pod, reduce the risk of a clogged upper needle, and/or prevent the ejection of brew pod contents would be particularly beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a beverage dispensing assembly is provided for use with an appliance. The beverage dispensing assembly may include a brewing body, a shutter door, a lower needle assembly, and an upper needle assembly. The brewing body may define an access aperture and a brew chamber to receive a brew pod. The brewing body may include a bottom plate defining an outlet into the brew chamber along a delivery axis. The shutter door may be slidably attached to the brewing body to move between an open setting and a closed setting. The shutter door may be positioned across the access aperture in the closed setting. The lower needle assembly may be operably attached to the shutter door and include a lower needle slidably disposed within the brewing body along the delivery axis to move between a retracted position and an extended position. The upper needle assembly may be operably attached to the shutter door and include an upper needle slidably disposed within the brewing body along the delivery axis to move between a retracted position and an extended position.

In another aspect of the present disclosure, an appliance is provided. The appliance may include a cabinet defining a chilled chamber, a door being rotatably hinged to the cabinet and defining a dispenser recess, a dispensing assembly positioned within the dispenser recess and including a water delivery tube extending along the vertical direction, and a brew module being removably mounted to the dispensing assembly. The brew module may include a brewing body, a shutter door, a lower needle assembly, and an upper needle assembly. The brewing body may define an access aperture and a brew chamber to receive a brew pod. The brewing body may include a bottom plate defining an outlet into the brew chamber along a delivery axis. The shutter door may be slidably attached to the brewing body to move between an open setting and a closed setting. The shutter door may be positioned across the access aperture in the closed setting. The lower needle assembly may be operably attached to the shutter door and include a lower needle slidably disposed within the brewing body along the delivery axis to move between a retracted position and an extended position. The upper needle assembly may be operably attached to the shutter door and include an upper needle slidably disposed within the brewing body along the delivery axis to move between a retracted position and an extended position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In some aspects of the present disclosure, a refrigerator appliance including a beverage dispensing assembly is provided. The beverage dispensing assembly may include a brewing body that contains a lower needle and an upper needle. The brewing body may be shaped to receive a brew pod. Both needles may be configured to slide along a vertical delivery axis towards the brew pod. A sliding shutter door may also be provided on the brewing body. The door may be attached to the lower and upper needles such that closing the shutter door slides the needles towards the brew pod.

Figure 1:
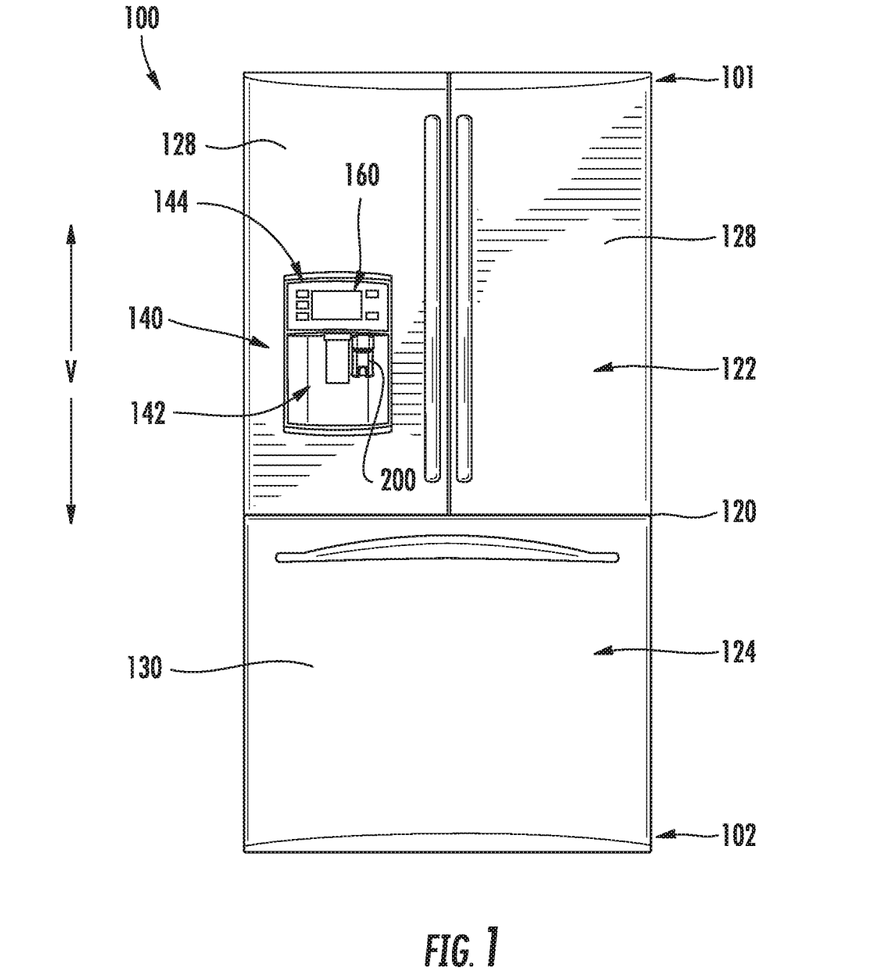
FIG. 1 provides a front, elevation view of a refrigerator appliance according to an exemplary embodiment of the present disclosure.

Turning now to the figures, FIG. 1 provides a front, elevation view of a refrigerator appliance 100 according to an exemplary embodiment of the present subject matter. Refrigerator appliance 100 includes a cabinet or housing 120. Housing 120 extends between an upper portion 101 and a lower portion 102 along a vertical direction V. Housing 120 defines chilled chambers, e.g., a fresh food compartment 122 positioned adjacent upper portion 101 of housing 120 and a freezer compartment 124 arranged at lower portion 102 of housing 120. Housing 120 also defines a mechanical compartment (not shown) for receipt of a sealed cooling system for cooling fresh food compartment 122 and freezer compartment 124.

Refrigerator appliance 100 is generally referred to as a bottom-mount refrigerator appliance. However, it should be understood that refrigerator appliance 100 is provided by way of example only. Thus, the present subject matter is not limited to refrigerator appliance 100 and may be utilized in any suitable refrigerator appliance. For example, one of skill in the art will understand that the present subject matter may be used with side-by-side style refrigerator appliances or top-mount refrigerator appliances as well.

Refrigerator doors 128 are rotatably hinged to housing 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Figure 2:
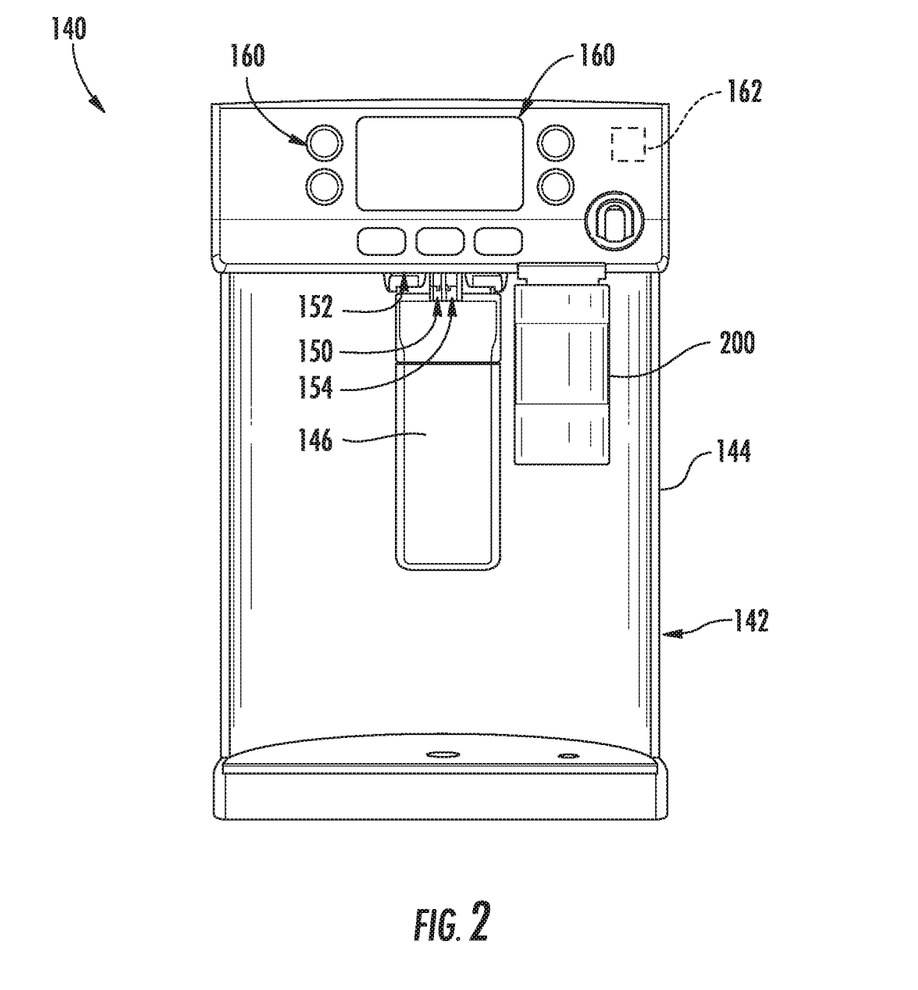
FIG. 2 provides a front, elevation view of a dispensing assembly of the exemplary refrigerator appliance of FIG. 1.

Refrigerator appliance 100 may also include a dispensing assembly 140 for dispensing various fluids, such as liquid water and/or ice, to a dispenser recess 142 defined on one of refrigerator doors 128. In some embodiments, dispensing assembly 140 includes a dispenser 144 positioned on an exterior portion of refrigerator appliance 100, for example, within dispenser recess 142. Dispenser 144 includes several outlets for accessing ice, chilled liquid water, and heated liquid water. In order to access ice, chilled liquid water, and heated liquid water; water-dispensing assembly 140 may, for example, include a paddle 146 mounted below a chilled water outlet 150, an ice outlet 152, and a heated water outlet 154.

During operation of dispensing assembly 140, user may urge a vessel, such as a cup, against paddle 146 to initiate a flow of chilled liquid water, heated liquid water and/or ice into the vessel within dispenser recess 142. In particular, a control panel or user interface panel 160 may be provided for controlling the mode of operation of dispenser 144, e.g., for selecting chilled liquid water, heated liquid water, crushed ice, and/or whole ice. User interface panel 160 may include a chilled water dispensing button (not labeled), an ice-dispensing button (not labeled) and a heated water dispensing button (not labeled) for selecting between chilled liquid water, ice, and heated liquid water, respectively. User interface panel 160 may also include a display component, such as a digital or analog display device designed to provide operational feedback to the user.

Outlets 150, 152, and 154 and paddle 146 may comprise an external part of dispenser 144 positioned at or adjacent dispenser recess 142, e.g., a concave portion defined in an outside surface of refrigerator door 128. Dispenser 144 is positioned at a predetermined elevation convenient for a user to access ice or liquid water, e.g., enabling the user to access ice without the need to bend-over and without the need to access freezer compartment 124. In the exemplary embodiment, dispenser 144 is positioned at a level that approximates the chest level of a user.

Operation of the refrigerator appliance 100 can be regulated by a controller 162 that is operatively coupled to user interface panel 160 and/or various sensors as discussed below. User interface panel 160 provides selections for user manipulation of the operation of refrigerator appliance 100 such as e.g., selections between whole or crushed ice, chilled water, and/or other various options. In response to user manipulation of the user interface panel 160 or sensor signals, controller 162 may operate various components of the refrigerator appliance 100. Controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 162 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 162 may be positioned in a variety of locations throughout refrigerator appliance 100. In the illustrated embodiment, controller 162 is located within the user interface panel 160. In other embodiments, the controller 162 is positioned at any suitable location within refrigerator appliance 100, such as for example within a fresh food chamber, a freezer door, etc. Input/output ("I/O") signals may be routed between controller 162 and various operational components of refrigerator appliance 100. For example, user interface panel 160 may be in communication with controller 162 via one or more signal lines or shared communication busses.

As illustrated, controller 162 may be in communication with the various components of dispensing assembly 160 and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

In certain embodiments, refrigerator appliance 100 also includes features for generating heated liquid water and directing such heated liquid water to dispenser 144. Refrigerator appliance 100 need not be connected to a residential hot water heating system in order to supply heated liquid water to dispenser 144. Features of such a water heating assembly may be embodied by the disclosure of U.S. Pat. No. 9,254,058 (herein incorporated by reference) may include, for example, a variety of water supplies, hot water tanks, heating elements, temperature sensors, and control valves to heat water from a well or municipal water supply, store the heated water, and supply the heated water to dispenser 144.

Dispensing assembly 140 is optionally capable of providing heated water at various temperatures depending on the type of beverage being brewed. For example, when brewing ground coffee, water for brewing may be heated to between one hundred and eighty degrees Fahrenheit and one hundred and ninety degrees Fahrenheit. Additionally or alternatively, dispensing assembly 140 may be adjusted to provide water for making beverages at any suitable temperature.

Figure 9:
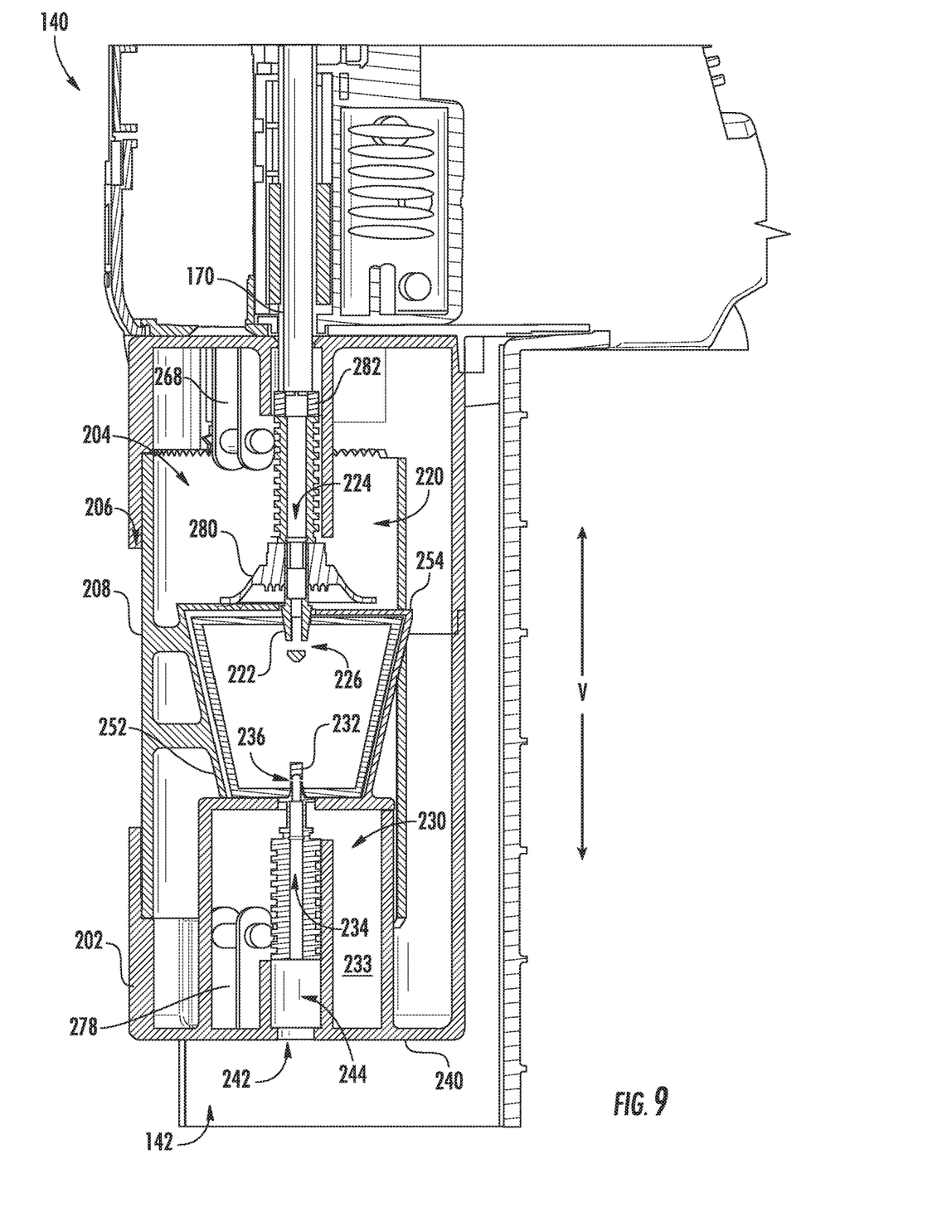
FIG. 9 provides a cross sectional view of the exemplary brew module mounted to the exemplary dispensing assembly of FIG. 2, wherein the upper needle and the lower needle are shown in an extended position.

As illustrated in FIG. 9, dispensing assembly 140 generally includes a water delivery tube 170 for supplying heated water from the water heating assembly to dispenser 144. For example, water delivery tube 170 may be embodied by a moving water delivery tube. Moving water delivery tube 170 may be any suitably rigid conduit or piping that is configured for moving in a substantially vertical direction V. More specifically, moving water delivery tube 170 may extend between a retracted position where it is retracted within dispenser 144 and an extended position where it protrudes downward along the vertical direction V away from dispenser 144. In an exemplary embodiment, moving water delivery tube 170 is a vertically oriented stainless steel tube that extends into and provides heated water to a brew module 200. A drive assembly (not pictured), such as an electric drive motor and worm gear, may be provided, to move water delivery tube 170.

Referring now generally to FIGS. 2 through 7, dispensing assembly 140 includes a brew module 200 according to an exemplary embodiment of the present subject matter. Brew module 200 is mountable within dispenser recess 142 such that brew module 200 is in fluid communication with water delivery tube 170 when mounted within dispenser recess 142. For example, when brew module 200 is installed in dispenser 144, an inlet 284 defined in a top surface of brewing body 204 is in vertical alignment with the water delivery tube 170. Dispenser 144 may be configured for extending water delivery tube 170 downward along the vertical direction V such that water delivery tube 170 is received into inlet 284. During use, heated water from the water heating assembly may flow into brew module 200 via water delivery tube 170 at inlet 284.

Brew module 200 includes a body 202, including one or more body elements that define a brew chamber 204. Brew chamber 204 may be substantially cylindrical in shape and configured to receive a brew pod 210, e.g., through an access aperture 206. As shown, access aperture 206 generally provides an opening extending from brew chamber 204 and through body 202, e.g., in the radial direction R. Brew pod 210 may be inserted and/or removed from brew chamber 204 through access aperture 206. A shutter door 208 is slidably attached to brewing body 202 to selectively cover access aperture 206, as will be described in detail below. A delivery axis DA is defined by brewing body 202, e.g., perpendicular to the radial direction R, and may extend parallel to the vertical direction V when brew module 200 is mounted to refrigerator appliance 100 (see FIG. 1). In some embodiments, brewing body 202 further defines a circumferential direction C that extends about delivery axis DA and is perpendicular to delivery axis DA.

Brew pod 210 is generally a container which contains or is fillable with a predetermined amount of brewing contents, such as coffee, tea, hot chocolate, lemonade, or the like. The brewing contents are mixed, brewed, etc. with water to create a beverage that is dispensed to the user. According to some exemplary embodiments, brew pod 210 may also include a filter (not shown) positioned within brew pod 210 and configured for filtering brewing contents, such as coffee grounds or tea leaves. Brew pod 210 may be a single-use pod or a reusable pod. A top cover 212 of brew pod 210 may enclose an opening of brew pod 210. Top cover 212 may be formed from a suitable foil material, such as aluminum foil, e.g., when brew pod 210 is a single-use pod.

As illustrated, brew module 200 includes an upper needle assembly 220, which includes an upper needle 222 positioned at or proximate a top portion of brew chamber 204. In addition, brew module 200 includes a lower needle 232 positioned at or proximate a bottom portion of brew chamber 204. Needles 222, 232 are each disposed within brewing body 202 along delivery axis DA. Needles 222, 232 are generally configured for piercing brew pod 210. Specifically, upper needle 222 may be configured to pierce top cover 212 of brew pod 210, while lower needle 232 is configured to pierce the bottom 214 of brew pod 210. Thus, needles 222, 232 may be spaced apart from each other, e.g., along the vertical direction V, and/or positioned opposite each other about brew pod 210. Needles 222, 232 may define one or more channels and/or apertures for passing liquid through needles 222, 232. For example, upper needle 222 may define a flow channel 224 and one or more water supply holes 226. Flow channel 224 and water supply holes 226 are configured for supplying heated water from water delivery tube 170 into brew pod 210 to facilitate the brewing or beverage making process. Similarly, lower needle 232 may define a flow channel 234 and one or more apertures 236 through which liquid may pass out of brew pod 210. Needles 222, 232 may be positioned coaxially, e.g., on the delivery axis DA, in certain exemplary embodiments. Alternatively, needles 222, 232 may be positioned in offset alignment, i.e., such that lower needle 232 is not coaxial to upper needle 222.

In some embodiments, brew module 200 includes a base plate 240 defining an outlet 242 through brewing body 202. An outlet chamber 244 may be defined above outlet 242 within brew chamber 204. Moreover, outlet chamber 244 may be disposed in fluid communication between brew chamber 204 and outlet 242. In optional embodiments, a pod seat 246 is positioned within brewing body 202 between the base plate 240 and the upper needle assembly 220. The pod set 246 may define a pin hole 248 in fluid communication with outlet 242. Optionally, pin hole 248 may be coaxial with outlet 242. At least a portion of lower needle assembly 230 may be positioned below pod set 246 such that lower needle 232 may be selectively moved through pin hole 248 and into brew pod 210.

Brewed beverage may be dispensed from brew module 200 through outlet chamber 244 and outlet 242. For example, flow channel 234 and apertures 236 of lower needle 232 place brew chamber 204 and outlet chamber 244 in fluid communication such that brewed beverage may drain from brew chamber 204 and flow out of brew module 200. Optionally, outlet chamber 244 and/or outlet 242 may be defined about delivery axis DA such that brewed beverage drains along delivery axis DA before exiting brew module 200.

In some exemplary embodiments, one or more pod supports 252, 254 are provided within brew chamber 204. Generally, pod supports 252, 254 are shaped to receive or substantially match brew pod 210. When brew pod 210 is positioned within brew chamber 204, pod supports 252, 254 enclose brew pod 210 and ensure brew pod 210 is aligned relative to the upper needle assembly 220 and lower needle assembly 230. In some such exemplary embodiments, a first pod support 252 extends from shutter door 208 toward delivery axis DA. A second pod support 254 may extend from pod seat 246, e.g., in the vertical direction V. Second pod support 254 may be complementary to first pod support 252, e.g., as an adjoining half of an enclosure for brew pod 210. Optionally, second pod support 254 may be fixed relative to pod set 246 while first pod support 252 is slidable relative to pod set 246. As shutter door 208 slides relative to brewing body 202, first pod support 252 may rotate about delivery axis DA, second pod support 254, and/or brew pod 210. In exemplary embodiments, a needle channel 256 is defined through a top portion of one or more of pod supports 252, 254 to receive upper needle 222 therethrough.

Figure 5:
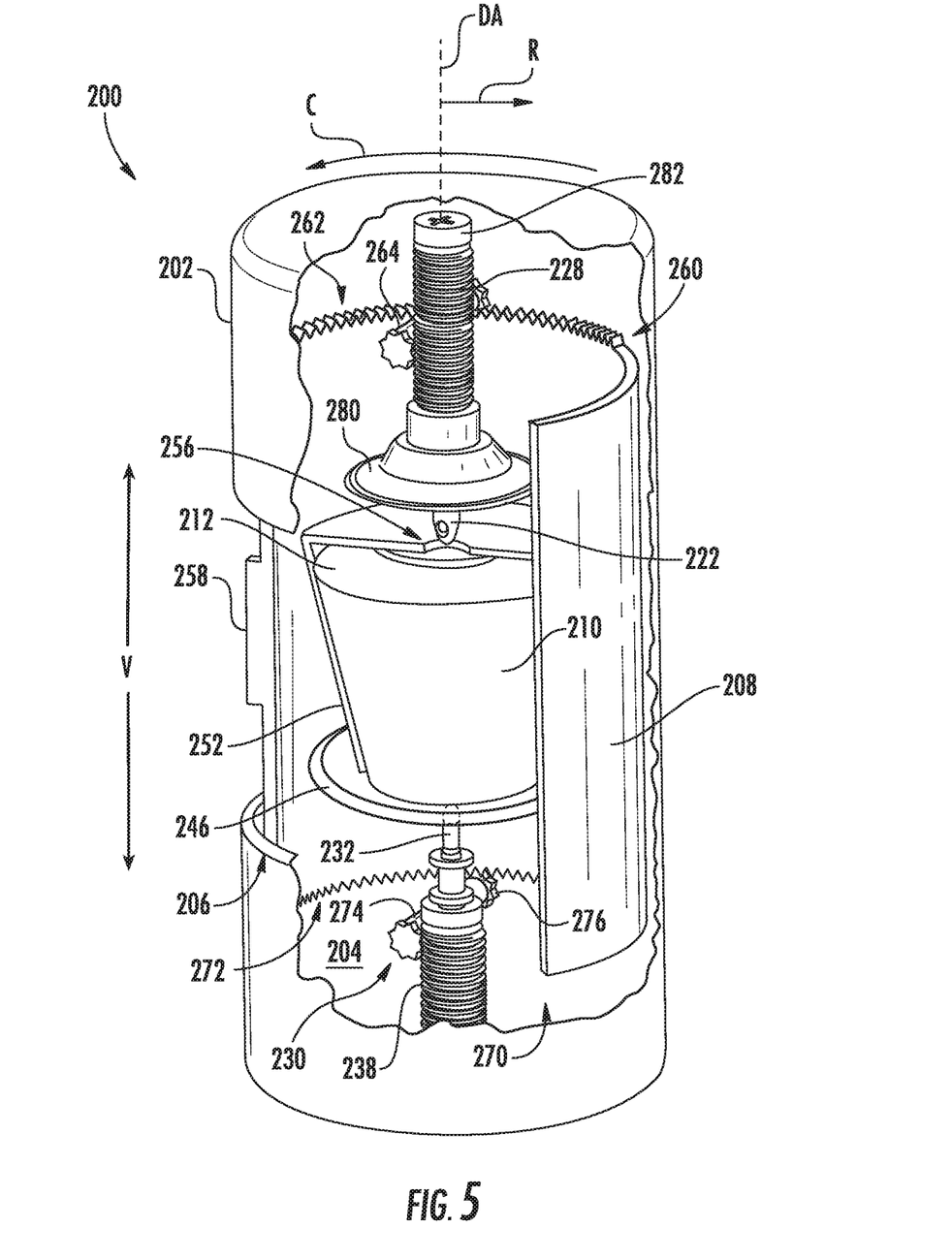
FIG. 5 provides a cut-away, perspective view of the exemplary brew module of FIG. 3, wherein the shutter door is shown in an intermediate setting.
Figure 6:
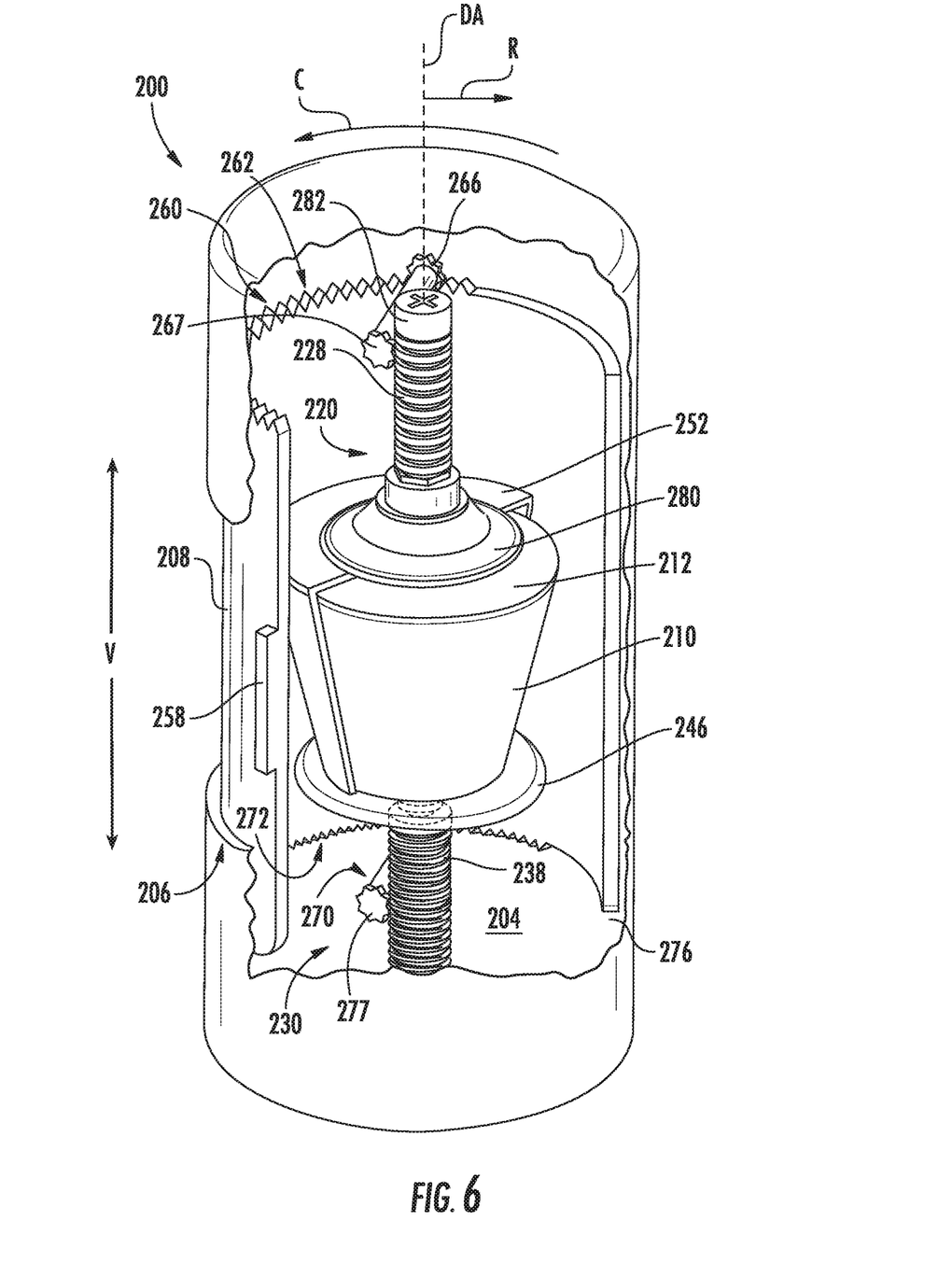
FIG. 6 provides a cut-away, perspective view of the exemplary brew module of FIG. 3, wherein the shutter door is shown in a closed setting.

Referring now specifically to FIGS. 4 through 7, in some exemplary embodiments, shutter door 208 is slidable between an open setting (see FIG. 4) and a closed setting (see FIG. 6), as well as one or more intermediate settings (see FIG. 5). Upper needle assembly 220 and/or lower needle assembly 230 may be operably attached to shutter door 208 such that one or more of the needles 222, 232 is automatically moved between a retracted position (see FIG. 4) and an extended position (FIG. 6) according to the setting of shutter door 208. For example, a top actuator 260 and a bottom actuator 270 may connect shutter door 208 to upper needle assembly 220 and lower needle assembly 230, respectively.

Figure 7:
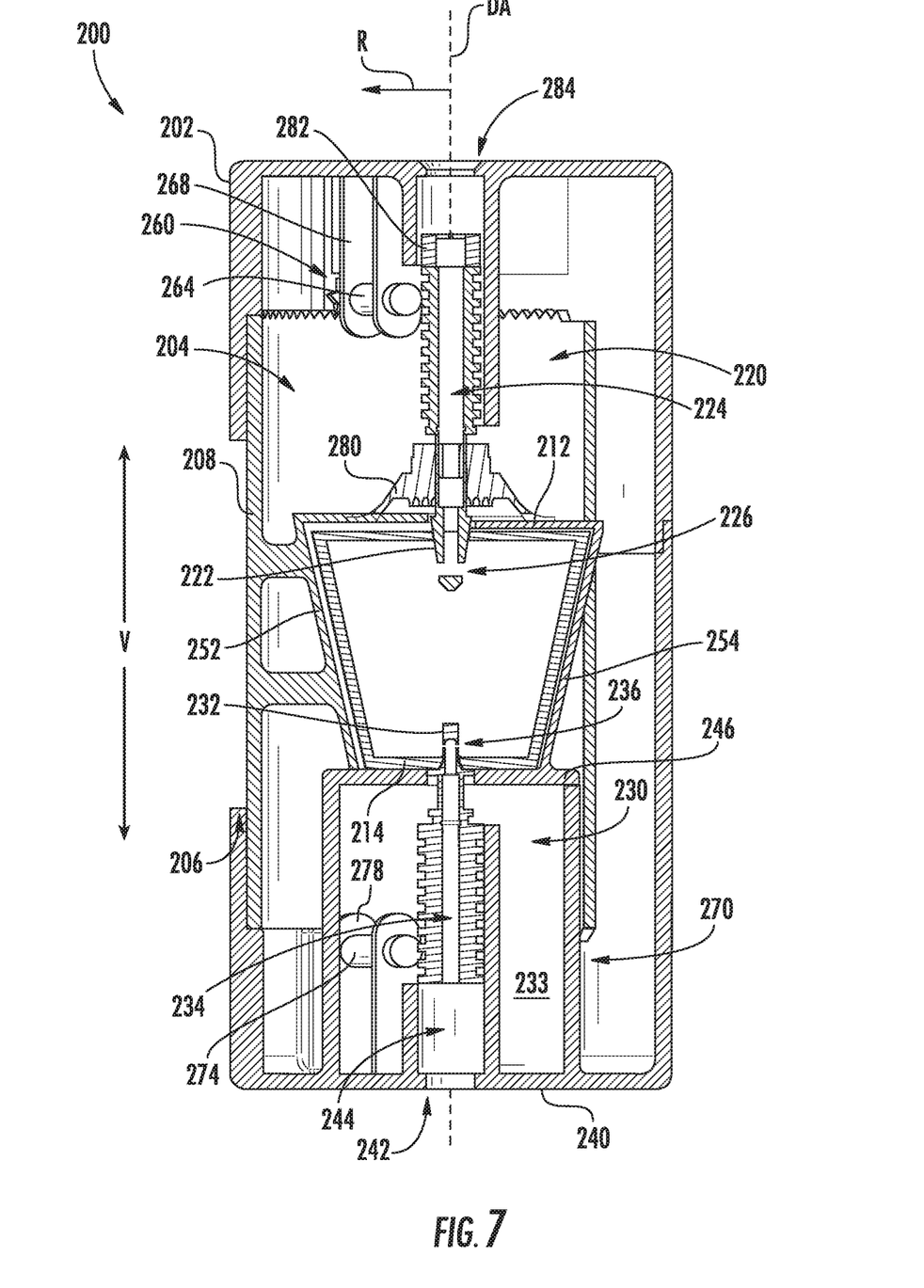
FIG. 7 provides a cross sectional view of the exemplary brew module of FIG. 3, wherein an upper needle and lower needle are shown in an extended position.
Figure 8:
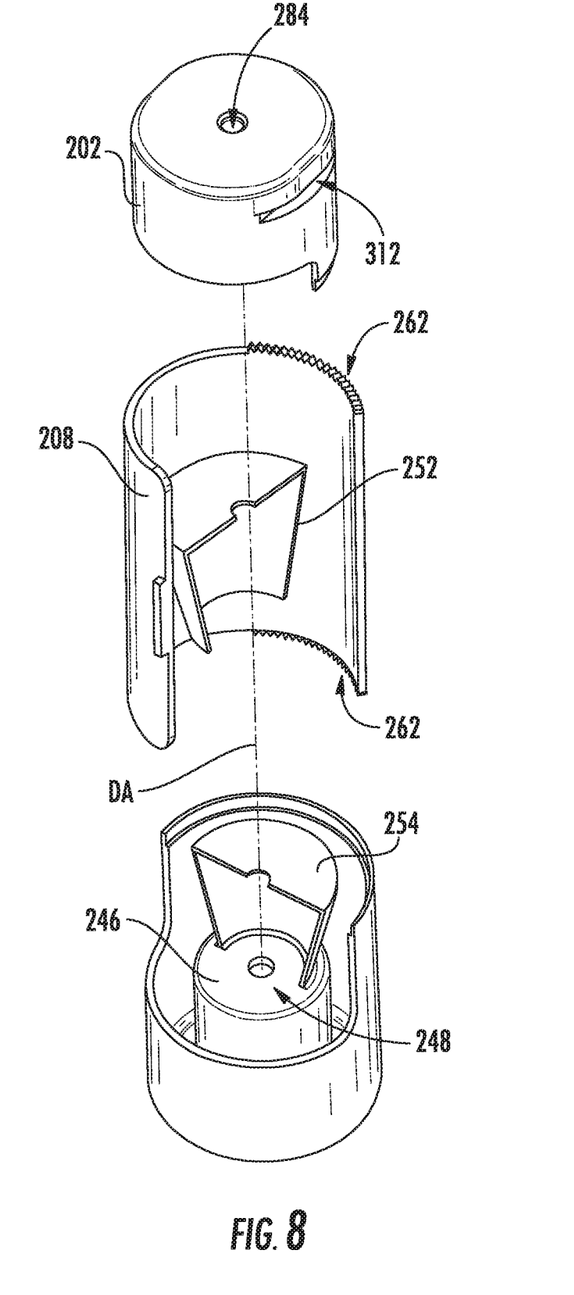
FIG. 8 provides a perspective view of the exemplary brew module of FIG. 3, wherein a brewing body is exploded for clarity.

In the retracted position of the upper needle 222, upper needle 222 is generally obscured within brew chamber 204. For example, upper needle 222 may be positioned above access aperture 206 along the delivery axis DA. A lowermost extreme of upper needle 222 may be higher along the vertical direction V than an uppermost extreme of access aperture 206 in the retracted position of upper needle 222. However, in the extended position of the upper needle 222, upper needle 222 is positioned downward from the retracted position, e.g., along the delivery axis DA toward the lower needle 232. In some exemplary embodiments, at least a portion of upper needle 222 extends below an uppermost extreme of access aperture along the delivery axis DA. As illustrated in FIG. 7, a portion of upper needle 222, including the portion defining water supply holes 226, may be positioned within brew pod 210 and below top cover 212 along the vertical direction V in the extended position of upper needle 222.

In the retracted position of the lower needle 232, lower needle 232 is generally obscured within the brew chamber 204. For example, lower needle 232 may be positioned below pod seat 246 along the delivery axis DA. An uppermost extreme of lower needle 232 may be lower along the vertical direction V than an uppermost extreme of pin hole 248 in the retracted position of lower needle 232. Optionally, lower needle 232 may be enclosed within a needle chamber 233 defined below pod seat 246 within brewing body 202. However, in the extended position of the lower needle 232, is positioned upward from the retracted position, e.g., along the delivery axis DA toward the upper needle 222. In some exemplary embodiments, at least a portion of lower needle 232 extends above an uppermost extreme of pin hole 248 along the delivery axis DA. As illustrated in FIG. 7, at least a portion of lower needle 232, including the portion defining the aperture(s) 236, may be positioned within brew pod 210 and above the bottom 214 along the vertical direction V in the extended position of lower needle 232.

In optional embodiments, shutter door 208 is rotatably disposed about delivery axis DA to slide along brewing body 202. For instance, shutter door 208 may be disposed along a portion of the circumferential direction C to slide about the delivery axis DA in the circumferential direction C. In exemplary embodiments, shutter door 208 is positioned radially inward from brewing body 202. A handle 258 extends from shutter door 208 in a radial direction R, away from delivery axis DA through access aperture 206. In the closed setting, shutter door 208 is positioned across access aperture 206. Shutter door 208 may span access aperture 206, blocking passage into brew chamber 204. In the open setting, shutter door 208 is positioned substantially away from access aperture 206, permitting brew pod 210 to pass through access aperture 206. Although shutter door 208 is positioned substantially away from access aperture 206 along the circumferential direction C, handle 258 may still extend through access aperture 206 along the radial direction R, away from delivery axis DA.

As illustrated in FIGS. 4 through 9, exemplary embodiments of brew module 200 include separate top and bottom actuators 260, 270 to operably connect upper and lower needle assemblies 220, 230 to shutter door 208.

Top actuator 260 optionally includes a set of upper rack teeth 262 and an upper pinion driveshaft 264. In some exemplary embodiments, upper rack teeth 262 are formed along a top circumferential portion of shutter door 208. In additional or alternative embodiments, upper pinion driveshaft 264 is mounted on a top fixed bracket 268 of brewing body 202 in pivotal engagement with upper rack teeth 262. Generally, upper rack teeth 262 and upper pinion driveshaft 264 connect to upper needle assembly 220 at a set of threaded teeth 228. When assembled, upper rack teeth 262 may be meshed with upper pinion driveshaft 264 at a first end 266, e.g., via a rotating pinion gear. At a second end 267, upper pinion driveshaft 264 may be meshed with the threaded teeth 228 of the upper needle assembly 220. As shown, the second end 267 may be positioned radially inward from the first end 266 relative to the delivery axis DA.

The top actuator 260 and upper needle assembly 220 may be geared to move upper needle 222 according to the position of the shutter door 208. For example, top actuator 260 and upper needle assembly 220 may be geared to move upper needle 222 vertically between a retracted position (see FIG. 4) and an extended position (see FIG. 6) as shutter door 208 moves circumferentially between an open setting (see FIG. 4) and a closed setting (see FIG. 6). The retracted position of the upper needle 222 may correspond to the open setting of shutter door 208 while the extended position of the upper needle 222 corresponds to the closed setting of the shutter door 208.

In additional or alternative embodiments, an upper compression spring (not pictured), such as a helical coil spring coaxial with delivery axis DA within brew chamber 204 above brew pod 210, is attached to upper needle 222 in downward-biased engagement. Upper needle 222 may thereby be biased toward the extended position. Furthermore, the upper compression spring may bias shutter door 208 toward the closed position. In some such embodiments, the top actuator 260 and upper needle assembly 220 are geared to compress the upper compression spring, e.g., along the delivery axis, in the retracted position and permit expansion of the upper compression spring, e.g., along the delivery axis DA, in the extended position.

Further additional or alternative embodiments may include an upper electric actuating motor (not pictured) operably attached to top actuator 260, e.g., in meshed engagement with threaded teeth 228, to drive upper needle 222 between the extended position and the retracted position. The upper electric actuating motor of such embodiments may be in communication with controller 162 via one or more signal lines or shared communication busses. The controller 162 may be configured to actuate the upper electric actuating motor according to the position of shutter door 208 or another desired condition (e.g., user input at user interface panel 160).

Bottom actuator 270 optionally includes a set of lower rack teeth 272 and a lower pinion driveshaft 274. In some exemplary embodiments, lower rack teeth 272 are formed along a bottom circumferential portion of shutter door 208. In additional or alternative embodiments, lower pinion driveshaft 274 is mounted on a bottom fixed bracket 278 of brewing body 202 in pivotal engagement with lower rack teeth 272. Generally, lower rack teeth 272 and lower pinion driveshaft 274 connect to lower needle assembly 230 at a set of threaded teeth 238. When assembled, lower rack teeth 272 may be meshed with lower pinion driveshaft 274 at a first end 276, e.g., via a rotating pinion gear. At a second end 277, lower pinion driveshaft 274 may be meshed with the threaded teeth 238 of the lower needle assembly 230. As shown, the second end 277 may be positioned radially inward from the first end 276 relative to the delivery axis DA.

The bottom actuator 270 and lower needle assembly 230 may be geared to move lower needle 232 according to the position of the shutter door 208. For example, bottom actuator 270 and lower needle assembly 230 may be geared to move lower needle 232 vertically between a retracted position (see FIG. 4) and an extended position (see FIG. 6) as shutter door 208 moves circumferentially between an open setting (see FIG. 4) and a closed setting (see FIG. 6). The retracted position of the lower needle 232 may correspond to the open setting of shutter door 208 while the extended position of the lower needle 232 corresponds to the closed setting of the shutter door 208. In optional embodiments, bottom actuator 270 and lower needle assembly 230 is geared to move lower needle 232 to the extended position before the top actuator 260 drives the upper needle 222 to the extended position as shutter door 208 slides to the closed setting. For example, lower rack teeth 272 and upper rack teeth 262 may be offset from each other along the circumferential direction C to provide the differential motion between the needles 222, 232. In additional or alternative examples, the lower rack teeth 272 and upper rack teeth 262 are formed to include distinct gear ratios, such that movement of lower rack teeth 272 translates to greater vertical movement of lower needle 232 than the corresponding movement of upper rack teeth 262 to upper needle 222. Advantageously, lower needle 232 will puncture the bottom 214 of brew pod 210 before upper needle 222 punctures top cover 212.

In additional or alternative embodiments, a lower compression spring (not pictured), such as a helical coil spring coaxial with delivery axis DA within brew chamber 204 below brew pod 210 and/or above pod seat 246, is attached to lower needle 232 in upward-biased engagement. Lower needle 232 may thereby be biased toward the extended position. Furthermore, the lower compression spring may bias shutter door 208 toward the closed position. In some such embodiments, the bottom actuator 270 and lower needle assembly 230 are geared to compress the lower compression spring, e.g., along the delivery axis, in the retracted position and permit expansion of the lower compression spring, e.g., along the delivery axis DA, in the extended position.

Further additional or alternative embodiments include a lower electric actuating motor (not pictured) operably attached to bottom actuator 270, e.g., in meshed engagement with threaded teeth 238, to drive lower needle 232 between the extended position and the retracted position. The lower electric actuating motor of such embodiments may be in communication with controller 162 via one or more signal lines or shared communication busses. The controller 162 may be configured to actuate the lower electric actuating motor according to the position of shutter door 208 or another desired condition (e.g., user input at user interface panel 160).

In some exemplary embodiments, upper needle assembly 220 may further include an inner seal 280 radially positioned about the upper needle 222. Inner seal 280 may be positioned to contain fluid in the extended position of the upper needle 222. For instance, inner seal 280 may engage pod support(s) 252, 254 and/or top cover 212 when upper needle 222 is in the extended position. In turn, inner seal 280 may prevent or restrict leaks of brewed beverage within brewing body 202. Inner seal 280 may ensure that heated water supplied into brew pod 210 does not leak into brew chamber 204. According to the exemplary embodiment, inner seal 280 may be a resilient cylindrical gasket that may include one or more ridges for ensuring a proper seal above brew pod 210, In additional or alternative embodiments, upper needle assembly 220 further includes an upper seal 282 positioned above upper needle 222. Upper seal 282 may be disposed in fluid communication with upper needle 222, e.g., above inner seal 280 along the delivery axis DA. Optionally, upper seal 282 may be provided as a resilient sleeve to receive water delivery tube 170. When brew module 200 is mounted to appliance 100, upper seal 282 may engage the water delivery tube 170 in a fluid seal. Although a resilient sleeve is shown in the present figures, it is understood that upper seal 282 may include a suitable additional or alternative configuration to engage water delivery tube 170 in a fluid seal.

Once brew pod 206 is received in brew module 200 and brew module 200 is inserted into dispenser 144 (see FIG. 1), water delivery tube 170 provides heated water into brew pod 206. The heated water may mix, brew, etc. with contents within brew pod 206, and the brewed beverage may then flow from brew module 200 into, for example, a container or cup (not shown) typically placed within dispenser recess 142 below brew module 200.

Figure 3:
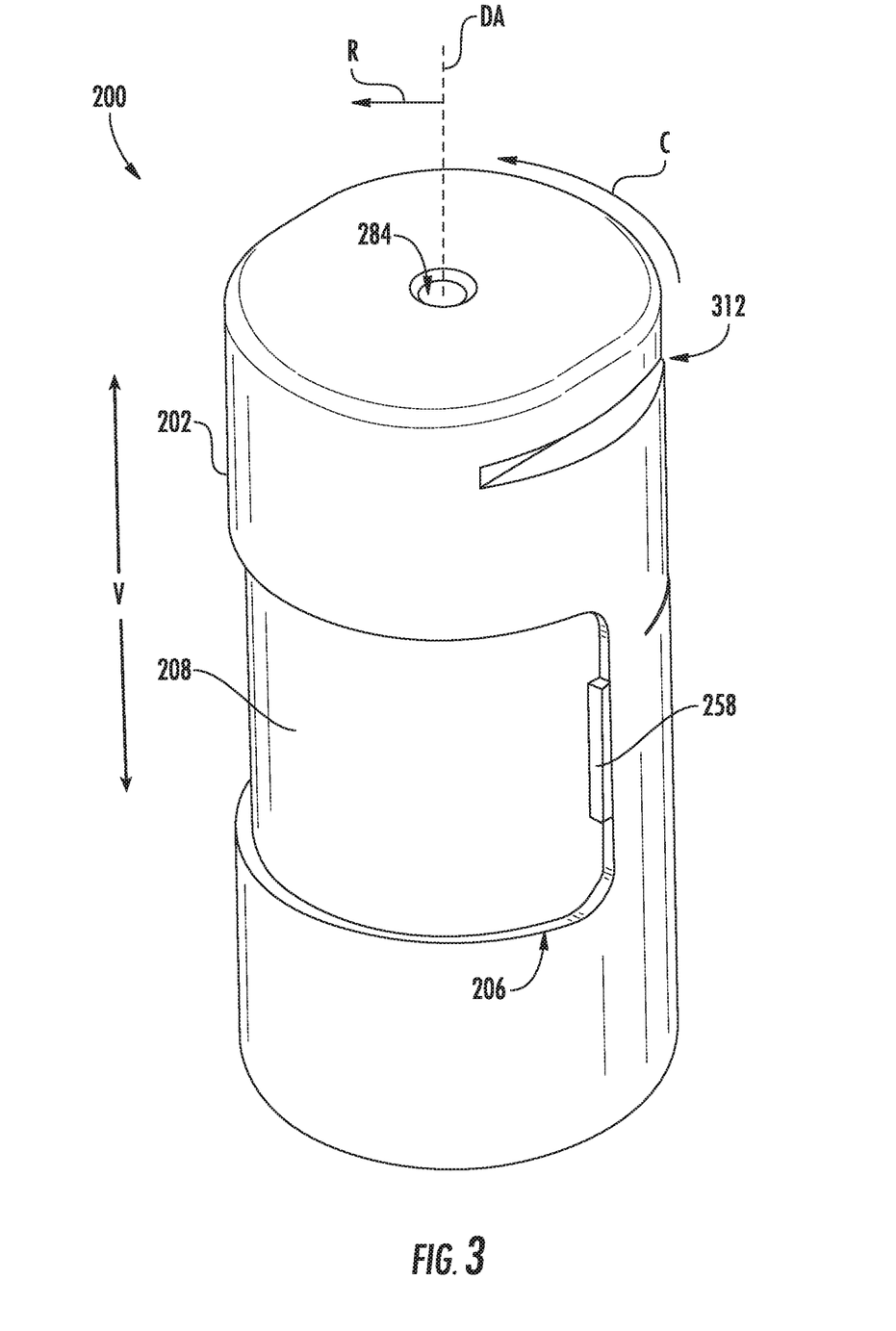
FIG. 3 provides a perspective view of an exemplary brew module for use with the exemplary dispensing assembly of FIG. 2, wherein a shutter door is shown in in a closed setting.
Figure 4:
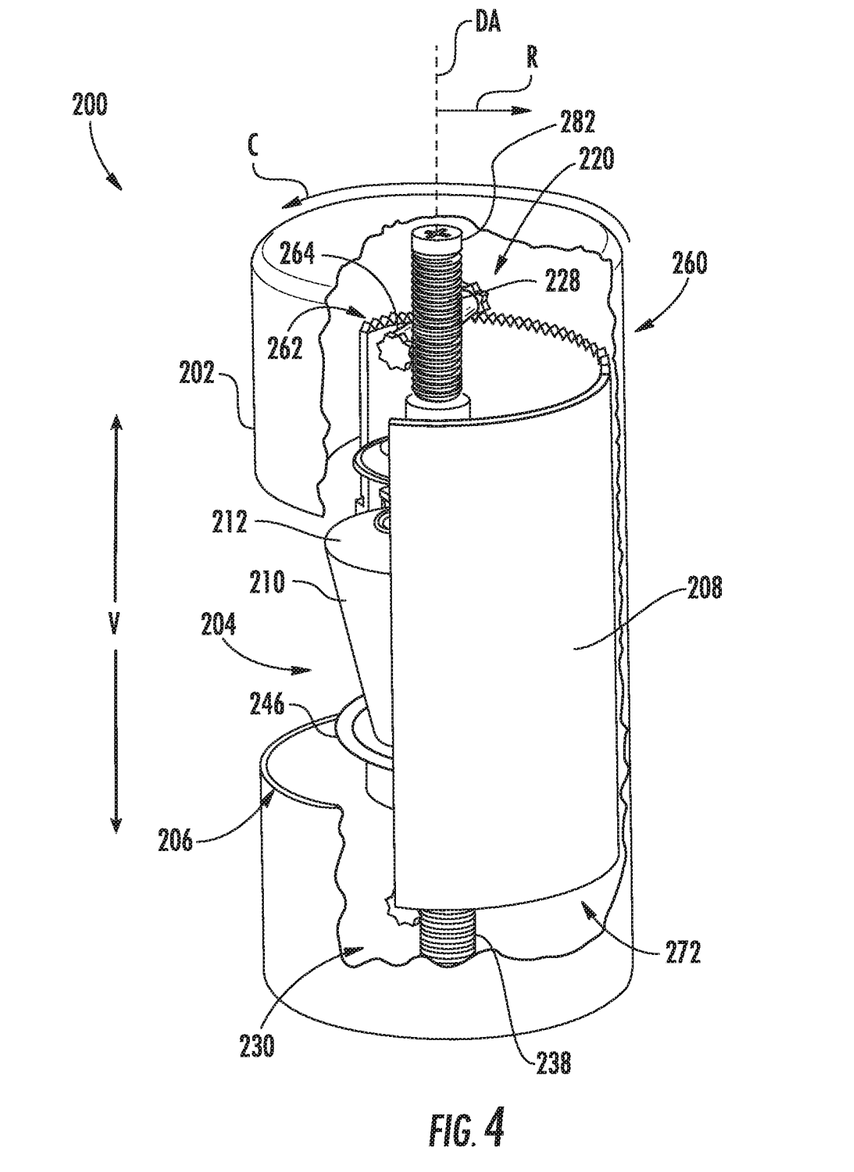
FIG. 4 provides a cut-away, perspective view of the exemplary brew module of FIG. 3, wherein the shutter door is shown in an open setting.
Figure 10:
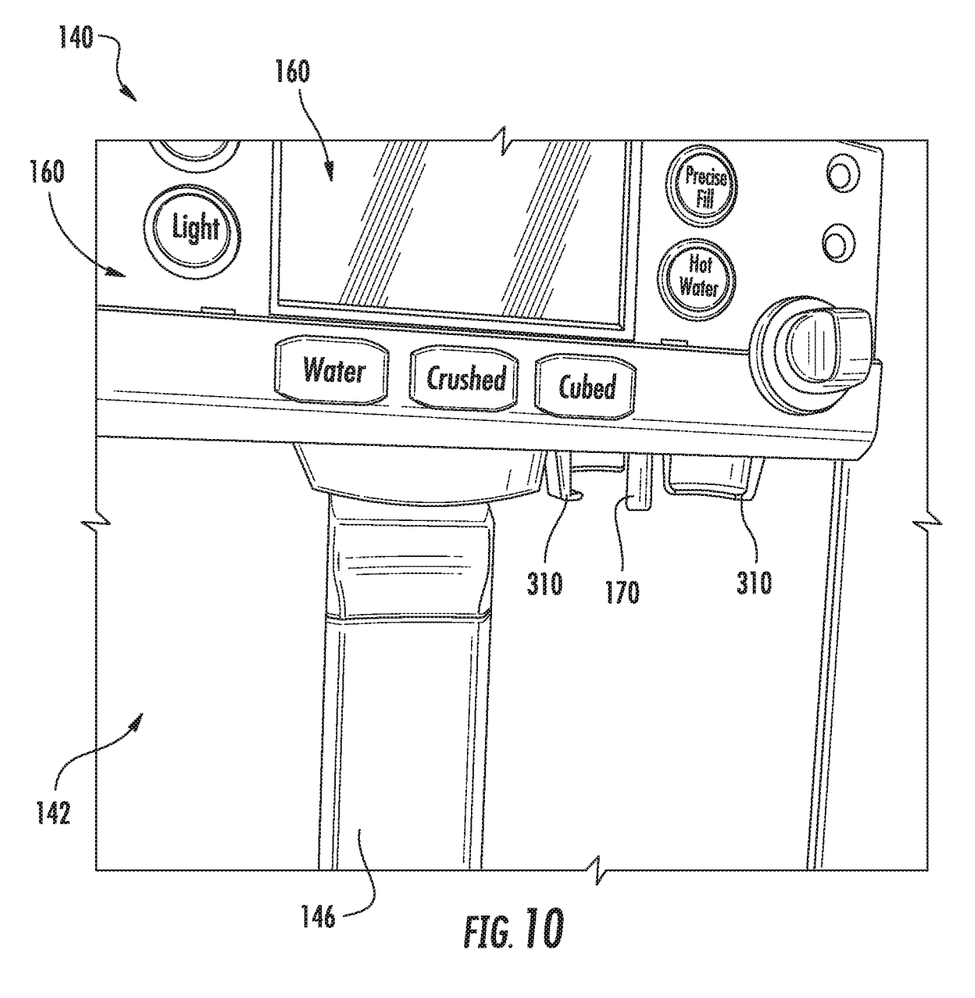
FIG. 10 provides a close-up view of an exemplary dispensing assembly of FIG. 2.

As best shown in FIGS. 3, 9, and 10, dispensing assembly 140 further includes features for mounting brew module 200 to dispenser 144. For example, dispenser 144 may define a plurality of flanges 310 that extend down from dispenser 144 and toward each other. Body 202 of brew module 200 may include a pair of corresponding transverse guide slots 312 to selectively engage appliance 100. Optionally, transverse guide slots 312 may be defined at a top portion of brewing body 202. Moreover, transverse guide slots 312 may be shaped to receive flanges 310. In this manner, a user may slide brew module 200 into engagement with dispenser 144 and flanges 310 may hold brew module 200 in place while dispensing the beverage.

One skilled in the art will appreciate that brew module 200 is used only for the purpose of explaining certain aspects of the present subject matter. Variations and modifications may be made without departing from the scope of the present subject matter. For example, different chamber configurations may be used, alternative needles geometries are possible, and other changes may be made as well while remaining within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A beverage dispensing assembly for use with an appliance, the beverage dispensing assembly comprising:
    a brewing body defining an access aperture and a brew chamber to receive a brew pod, the brewing body including a bottom plate at a bottom portion of the brew chamber and a top cover at a top portion of the brew chamber, the bottom plate defining an outlet extending into the brew chamber along a delivery axis, the access aperture providing an opening extending radially from the brew chamber through the brew body at a location between the top cover and the bottom plate;
    a shutter door slidably attached to the brewing body to move between an open setting and a closed setting, the shutter door positioned across the access aperture in the closed setting;
    a lower needle assembly connected to the shutter door, the lower needle assembly including a lower needle slidably disposed within the brewing body along the delivery axis to move between a retracted position and an extended position;
    an upper needle assembly connected to the shutter door, the upper needle assembly including an upper needle slidably disposed within the brewing body along the delivery axis to move between a retracted position and an extended position;
    a top actuator held within the brewing chamber below the top cover, the top actuator connecting the upper needle assembly and the shutter door to drive the upper needle to the extended position in response to the closed setting of the door; and
    a bottom actuator held within the brewing chamber above the bottom plate, the bottom actuator operably connecting the lower needle assembly and the shutter door to drive the lower needle to the extended position in response to the closed setting of the door,
    wherein the top actuator includes a set of upper rack teeth along a top circumferential portion of the door, and an upper pinion driveshaft extending between the door and the upper needle assembly, and
    wherein the bottom actuator includes a set of lower rack teeth along a bottom circumferential portion of the door, and a lower pinion driveshaft extending between the door and the lower needle assembly.

2. The beverage dispensing assembly of claim 1, wherein the brewing body defines a circumferential direction perpendicular to the delivery axis, and wherein the shutter door is rotatably disposed about the delivery axis along a portion of the circumferential direction.

3. The beverage dispensing assembly of claim 1, wherein the bottom actuator is geared to drive the lower needle to the extended position before the top actuator drives the upper needle to the extended position as the shutter door slides to the closed setting.

4. The beverage dispensing assembly of claim 1, wherein the brewing body includes a pod seat positioned between the bottom plate and the upper needle assembly, the pod seat defining a pin hole coaxial with the outlet.

5. The beverage dispensing assembly of claim 1, wherein the shutter door includes a pod support extending toward the delivery axis above the bottom plate to support the brew pod within the brew chamber.

6. The beverage dispensing assembly of claim 1, wherein the upper needle assembly includes an inner seal radially disposed about the upper needle to engage the brew pod in the extended position of the upper needle.

7. The beverage dispensing assembly of claim 1, further comprising:
    a compression spring attached in biased engagement with at least one of the lower needle assembly or the upper needle assembly.

8. The beverage dispensing assembly of claim 1, further comprising:
    an electric actuating motor connected to at least one of the lower needle assembly or the upper needle assembly.

9. A beverage dispensing assembly for use with an appliance, the beverage dispensing assembly comprising:
    a brewing body defining an access aperture and a brew chamber to receive a brew pod, the brewing body including a bottom plate at a bottom portion of the brew chamber and a top cover at a top portion of the brew chamber, the bottom plate defining an outlet extending into the brew chamber along a delivery axis, the access aperture providing an opening extending radially from the brew chamber through the brew body at a location between the top cover and the bottom plate;

a shutter door slidably attached to the brewing body to move between an open setting and a closed setting, the shutter door positioned across the access aperture in the closed setting;

an upper needle assembly operably connected to the shutter door, the upper needle assembly including an upper needle slidably disposed within the brewing body along the delivery axis to move between a retracted position and an extended position; and a top actuator held within the brewing chamber below the top cover, the top actuator connecting the upper needle assembly and the shutter door to drive the upper needle to the extended position in response to the closed setting of the door, wherein the top actuator includes a set of upper rack teeth along a top circumferential portion of the door, and an upper pinion driveshaft extending between the door and the upper needle assembly.

10. The beverage dispensing assembly of claim 9, wherein the brewing body defines a circumferential direction perpendicular to the delivery axis, and wherein the shutter door is rotatably disposed about the delivery axis along a portion of the circumferential direction.

11. The beverage dispensing assembly of claim 9, wherein the shutter door includes a pod support extending toward the delivery axis above the bottom plate to support the brew pod within the brew chamber.

12. The beverage dispensing assembly of claim 9, wherein the upper needle assembly includes an inner seal radially disposed about the upper needle to engage the brew pod in the extended position of the upper needle.

13. The beverage dispensing assembly of claim 9, further comprising:
a compression spring attached in biased engagement with the upper needle assembly.

14. A beverage dispensing assembly for use with an appliance, the beverage dispensing assembly comprising:
a brewing body defining an access aperture and a brew chamber to receive a brew pod, the brewing body including a bottom plate at a bottom portion of the brew chamber and a top cover at a top portion of the brew chamber, the bottom plate defining an outlet extending into the brew chamber along a delivery axis, the access aperture providing an opening extending radially from the brew chamber through the brew body at a location between the top cover and the bottom plate;
a shutter door slidably attached to the brewing body to move between an open setting and a closed setting, the shutter door positioned across the access aperture in the closed setting;
a lower needle assembly connected to the shutter door, the lower needle assembly including a lower needle slidably disposed within the brewing body along the delivery axis to move between a retracted position and an extended position;
an upper needle assembly connected to the shutter door, the upper needle assembly including an upper needle slidably disposed within the brewing body along the delivery axis to move between a retracted position and an extended position;
a top actuator held within the brewing chamber, the top actuator connecting the upper needle assembly and the shutter door to drive the upper needle to the extended position in response to the closed setting of the door; and
a bottom actuator held within the brewing chamber, the bottom actuator operably connecting the lower needle assembly and the shutter door to drive the lower needle to the extended position in response to the closed setting of the door,
wherein the brewing body defines a circumferential direction perpendicular to the delivery axis, and wherein the shutter door is rotatably disposed about the delivery axis along a portion of the circumferential direction,
wherein the top actuator comprises a set of upper rack teeth along a top circumferential portion of the door, and an upper pinion driveshaft extending between the door and the upper needle assembly, and
wherein the bottom actuator comprises a set of lower rack teeth along a bottom circumferential portion of the door, and a lower pinion driveshaft extending between the door and the lower needle assembly.

15. The beverage dispensing assembly of claim 14, wherein the bottom actuator is geared to drive the lower needle to the extended position before the top actuator drives the upper needle to the extended position as the shutter door slides to the closed setting.

16. The beverage dispensing assembly of claim 14, wherein the brewing body includes a pod seat positioned between the bottom plate and the upper needle assembly, the pod seat defining a pin hole coaxial with the outlet.

17. The beverage dispensing assembly of claim 14, wherein the shutter door includes a pod support extending toward the delivery axis above the bottom plate to support the brew pod within the brew chamber.

18. The beverage dispensing assembly of claim 14, wherein the upper needle assembly includes an inner seal radially disposed about the upper needle to engage the brew pod in the extended position of the upper needle.

19. The beverage dispensing assembly of claim 14, further comprising:
a compression spring attached in biased engagement with at least one of the lower needle assembly or the upper needle assembly.

20. The beverage dispensing assembly of claim 14, further comprising:
an electric actuating motor connected to at least one of the lower needle assembly or the upper needle assembly.

* * * * *